Aug. 18, 1953  G. W. DUNN  2,648,929
DEPTH CONTROL DEVICE FOR FISHING TACKLE
Filed April 19, 1949

INVENTOR.
GEORGE W. DUNN
BY Richey & Watts
ATTORNEYS

Patented Aug. 18, 1953

2,648,929

UNITED STATES PATENT OFFICE 2,648,929

DEPTH CONTROL DEVICE FOR FISHING TACKLE

George W. Dunn, Berea, Ohio

Application April 19, 1949, Serial No. 88,423

11 Claims. (Cl. 43—43.13)

This invention relates to the art of fishing, and more particularly to apparatus for controlling the depth of a lure during trolling, casting, or similar fishing operations.

At times during fishing operations wherein a lure is drawn through the water by either a boat or manipulation of a reel, or when fishing in tides or currents, it is desired to cause the lure to remain beneath the surface of the water or near the bottom. To this end relatively heavy sinkers have been suspended from the line forward of the lure. Other proposals involve the use of a device having inclined vanes, either at the lure or adjacent thereto arranged so that passage of the rig through the water or relative motion of the water and the rig urges it downwardly. Prior devices have been open to the serious objection that they offer constant resistance to motion of the rig through the water, so that sensitivity to the struggles of a hooked fish and ease and quickness of retrieve of the rig to the surface are greatly reduced.

It is a principal object of the invention to remove the retarding and lowering effect of a depth control fishing rig either upon occurrence of a strike or upon a quick jerking of the line by the fisherman. In the preferred embodiment of the invention this is accomplished by pendulously suspending from the line a depth control device having a vertical fin and lateral vane means substantially parallel to the line. In order to cause the device to dive, a depending rod is pivotally mounted forwardly of the device so that resistance of the water to motion of the rod therethrough exerts a torque on the device depressing of the lateral vane means. With this, pressure of the water on the upper surfaces of the lateral vane means causes the rig to dive, either until the rod strikes bottom or until the lifting force of the line is balanced. In order to remove the retardation and resistance, the device must receive a sudden jerk from either end of the line, whereupon the rod is released for free pivotal motion and the entire device can align itself with the line to provide minimum resistance as the device is drawn through the water.

Another object of the invention resides in provision of an adjustment whereby the force necessary to release the rod may be varied to suit various variable conditions such as expected fish size, line length, trolling or retrieving speed, etc.

Other objects reside in providing a device of the nature described which is light in weight, economical to manufacture and assemble, and readily manipulated and adjusted. The manner wherein these and other objects and advantages may be attained will be apparent from the following detailed description of a preferred embodiment of the invention.

Figure 1:
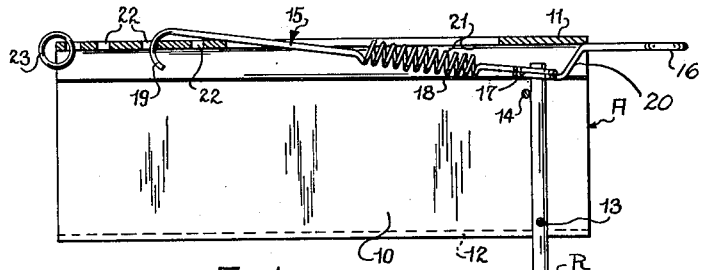
Fig. 1 is a longitudinal sectional view through the device showing the rod in its cocked position.
Figure 3:
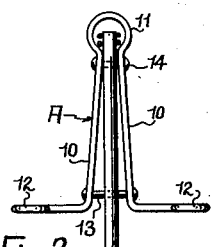
Fig. 3 is an end view of the device showing the trigger in section at the rod.
Figure 2:
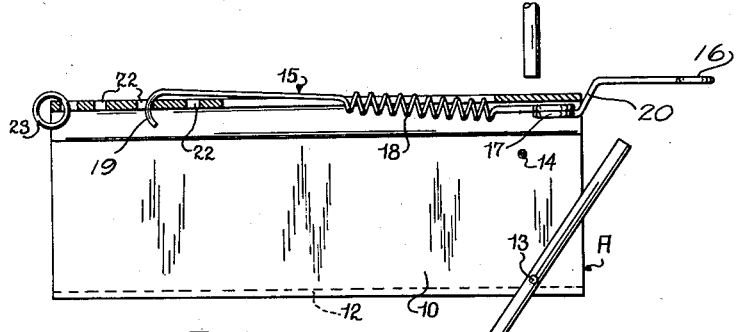
Fig. 2 is a similar sectional view through the device showing the rod in its released position.

In the preferred form of the invention the depth control device A includes a body made of thin sheet metal which may be either of corrosion-resistant material such as stainless steel, aluminum, plastic, and the like, or may be of carbon steel having a protective coating. The body includes a pair of generally vertical fins 10 joined at their upper edges by a substantially cylindrical section 11 and having extending from their bottom edges lateral vanes 12.

An elongated rod-like member R is pivoted to a forward portion of the body as at 13 and a stop pin 14 may be provided to limit pivotal motion of the member in one direction. The means to attach the forward or fishing line preferably comprises a member 15 formed of a single length of spring steel wire. Member 15 is configured to provide an eye portion 16 for attachment to the line, a loop portion 17 for frictionally restraining rod R against stop pin 14, a coil spring portion 18, and a hook portion 19 for attachment to the body. Member 15 is offset as at 20 to urge the loop portion toward and over the end of rod R when the device is cocked. The portion 11 of the body is slotted as at 21 and provided with a plurality of apertures 22 for selectively receiving the hook 19. Suitable eye means 23 are provided at the rearward portion of the body for connection to a leader, lure, or any other desired item of tackle. It is noted that the connecting means for the line and for the lure, namely eyes 16 and 23, are substantially disposed in a plane parallel to the vanes 12.

Figure 5:
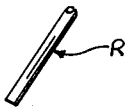
Fig. 5 is a diagram showing the device acting as a depth control unit.
Figure 5:
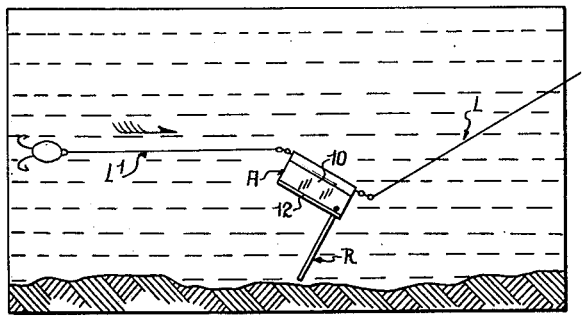
Figure 4:
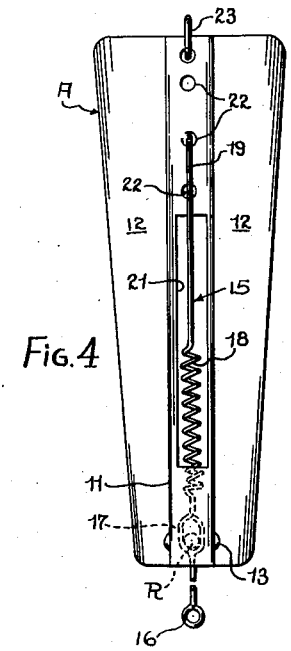
Fig. 4 is a plan view of the device.
Figure 6:
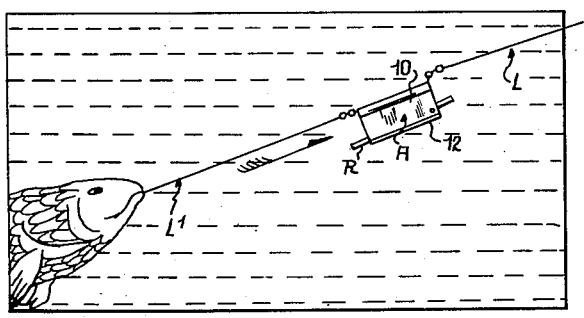
Fig. 6 is a diagram showing the device during retrieve thereof and after the trigger has been released.

In operation, a fishing line L and a leader or other lure L₁ are connected to their respective connecting means. The loop 17 is slipped over the upper extremity of member R (as shown in Fig. 1) and the hook 19 is disposed so as to apply the amount of tension to the spring 18 which is suitable for the weight of the tackle, speed of relative motion of the tackle in the water, and the expected size of the fish. The line is paid out and (assuming a trolling operation is being conducted) the lure and the control device are dragged through the water at the speed of the boat. Resistance of the water to motion of the rod R therethrough, coupled with the weight of the rod and its forward location, applies a torque to the device that initially overcomes the countertorque engendered by the drag of the lure and leader $L_1$, causing the device to cant as seen in Fig. 5.

Vanes 12 are now inclined downwardly in the direction of motion of the device through the water so that pressure is exerted against their upper surfaces, causing the device to dive. The diving action continues until the upward component or the force on the line L is balanced whereupon the device and the lure remain at a certain depth. The dimensions of rod R and its weight may be selected so that the device goes to the bottom (as shown in Fig. 5) or to any other desired depth.

As soon as the fish strikes the lure, or if the angler applies a sudden jerk or pull to the line, spring 18 elongates, offset 20 rides up over the end of the body, and loop 17 slips upwardly and forwardly clear of the end of rod R. Rod R is now free to pivot in the body so that it may substantially align itself with the line, providing minimum resistance by the water as the device is retrieved therethrough. Of course, the rod R is of finite weight so that water resistance alone cannot bring the rod absolutely and completely into alignment with the direction of retrieving motion but the alignment is substantial and there is nothing except the force of gravity to prevent complete alignment. Since the connecting points of the fishing line and the lure are substantially aligned with the vanes 12, the vanes 12 will now be oriented in a direction parallel to the direction of retrieve of the tackle so that the device offers very little resistance to the retrieving operation. This is highly advantageous in case a fish is hooked because the angler can readily sense the struggles of the fish during his retrieve. Since the weight of the device is small compared to that of the sinker usually employed for the purpose, there is no danger of small fishes taking the hook without warning the fisherman. Furthermore, if for any reason the fisherman wishes to quickly retrieve the tackle, he may do so by jerking on the line and reeling in without having to overcome the resistance and weight of a heavy sinker or permanently arranged deflecting plate.

The depth to which the device dives may be adjusted by varying the dimensions of the rod R or by varying its effective weight and resistance to the water. The support for the eye 16 may be bent to produce the desired alignment of the lines with vanes 12.

Having completed a description of a preferred form of the invention it can be seen that I have increased the sensitivity of trolling or other types of fishing tackle wherein there is relative motion between the tackle and the water, and wherein it is desired to have the tackle below the surface of the water. It can also be seen that I have provided a rig which is readily retrieved or reeled in, which is readily fabricated from a few simple and inexpensive parts, and which can easily be adjusted for various conditions that may be encountered.

Although I have described a preferred form of the device, it will be understood that the aforesaid advantages and objects may be attained with other constructions, and accordingly, I contemplate that the appended claims and not the preferred construction define the scope of the invention.

What is claimed is:

1. A device of the nature described comprising vertical fin means, lateral vane means extending from said fin means, forward and rearward means substantially parallel to said vanes for connecting the same to fishing tackle, a depending member pivotally mounted forwardly on said device and extending below said vane means, means on one of said connecting means to resiliently restrain said member in a position angular to said vane means, and means including the other of said connecting means for releasing said pivoted member upon application of a predetermined tensile force between said connecting means so that said member may move toward fore and aft alignment with said vane means in response to resistance due to relative motion of said member and the water.

2. A depth control device for fishing tackle comprising vertical fin means and lateral vane means extending from a lower portion of said fin means, means for connecting a line to the forward portion of said fin means and a lure to the rearward portion thereof with said connecting means defining a line substantially parallel to said lateral vane means, an elongated depending member pivotally mounted at a forward portion of said fin means, means for restraining said member in a position at an angle to said lateral vanes, and means responsive to increased tension between said connecting means for releasing said elongated member so that the latter may move toward alignment with said lateral vane means in response to resistance due to relative motion of said member and the water.

3. A depth control device for fishing tackle comprising vertical fin means and lateral vane means extending from a lower portion of said fin means, means for connecting a line to the forward portion of said fin means and a lure to the rearward portion thereof with said connecting means defining a line substantially parallel to said lateral vane means, an elongated depending member pivotally mounted at a forward portion of said fin means, said line connecting means comprising a latch engaging said elongated member above its pivot and a spring extending rearwardly from said latch and fastened to said device, said spring tending to restrain said elongated member at an angle to said lateral vane means whereby increased tension between said connecting means may stretch said spring and release said latch so that the elongated member may by pivotal motion substantially align itself with said lateral vane means in response to resistance due to relative motion of said member and the water.

4. A depth control device for fishing tackle comprising a pair of vertical fins joined at their upper edges and vanes extending laterally from their lower edges, means for connecting a line to the forward portion of said fin means and a lure to the rearward portion thereof with said connecting means defining a line substantially parallel to said lateral vane means, an elongated depending member pivotally mounted forwardly of and between said fins, means for restraining said member at an angle to said lateral vanes, and means responsive to increased tension between said connecting means for releasing said elongated member so that the latter may by pivotal motion be substantially aligned with said lateral vanes.

5. A depth control device for fishing tackle comprising a pair of vertical fins joined at their upper edges with vanes extending laterally from their lower edges, means for connecting a line to the forward portion of said fins and a lure to the rearward portion thereof with said connecting means defining a line substantially parallel to said lateral vane means, an elongated depending member pivotally mounted forwardly of and between said fins, said line connecting means comprising a latch engaging said elongated member above its pivot and a spring extending rearwardly from said latch and fastened to said device, said spring tending to restrain said elongated member at an angle to said lateral vane means whereby increased tension between said connecting means may stretch said spring and release said latch so that the elongated member may by pivotal motion be substantially aligned with said lateral vane means.

6. A depth control device for fishing tackle comprising vertical fin means and lateral vane means extending from a lower portion of said fin means, means for connecting a lure to a rearward portion of said fin means, an elongated depending member pivotally mounted at a forward portion of said fin means, line connecting and latch means formed of a length of spring wire comprising a hook for attachment to said fin means, a spring leading from said hook, a loop attached to said spring and arranged to frictionally restrain the upper end of said elongated member, and connecting means for a fish line leading from said loop, said spring tending to restrain said elongated member at an angle to said lateral vane means whereby increased tension between said fish line and lure connecting means may stretch said spring and cause said loop to slip clear of said elongated member so that the latter may by pivotal motion substantially align itself with said lateral vane means in response to resistance due to relative motion of said member and the water.

7. A depth control device for fishing tackle comprising vertical fin means and lateral vane means extending from a lower portion of said fin means, means for connecting a lure to a rearward portion of said fin means, an enlongated depending member pivotally mounted at a forward portion of said fin means, line connecting and latch means formed of a length of spring wire comprising a hook for attachment to said fin means, a spring leading from said hook, a loop attached to said spring and arranged to frictionally restrain the upper end of said elongated member, and connecting means for a fish line leading from said loop, said spring tending to restrain said elongated member at an angle to said lateral vane means, means to adjust the tension of said spring, said loop being so arranged that increased tension between said fish line and lure connecting means stretches said spring and causes said loop to slip clear of said elongated member so that the latter may by pivotal motion substantially align itself with said lateral vane means in response to resistance due to relative motion of said member and the water.

8. A depth control device for fishing tackle comprising a pair of vertical fins joined at their upper edges with vanes extending laterally from their lower edges, means for connecting a lure to a rearward portion of said device, an elongated depending member pivotally mounted forwardly between said fins, line connecting and latch means formed of a length of spring wire comprising a hook for attachment to said device, a spring leading from said hook, a loop attached to said spring and arranged to frictionally restrain the upper end of said elongated member, and attaching means for a fish line leading from said loop, said spring tending to restrain said elongated member at an angle to said lateral vanes whereby increased tension between said connecting means may stretch said spring and cause said loop to slip clear of said elongated member so that the latter may by pivotal motion substantially align itself with said lateral vanes in response to resistance due to relative motion of said member and the water.

9. A depth control device for fishing tackle comprising vertical fin means and lateral vane means extending from said fin means, means for connecting a line to the forward portion of said device and a lure to the rearward portion thereof with said connecting means defining a line substantially parallel to said lateral vane means, an elongated depending member pivotally mounted at a forward portion of said device, means for restraining said member at an angle to said lateral vanes, and means responsive to increased tension between said connecting means for releasing said elongated member so that the latter is free to move toward alignment with said lateral vane means.

10. A depth control device for fishing tackle comprising vertical fin means and lateral vane means extending from said fin means, means for connecting a line to the forward portion of said device and a lure to the rearward portion thereof with said connecting means defining a line substantially parallel to said lateral vane means, an elongated depending member pivotally mounted at a forward portion of said device formed with a surface against which water can impinge, when said member moves therethrough, to bias the same to a position having a minimum of resistance to such motion through water, means for restraining said member at an angle to said lateral vanes, and means responsive to increased tension between said connecting means for releasing said elongated member so that the latter may move toward alignment with said lateral vane means in response to said bias due to relative motion of said member and the water.

11. A fishing device comprising two members joined for relative motion, one of said members having connecting means for connecting the same to a fishing line, and a connecting means for connecting the same to a fish hook, both of said members being formed with surfaces against which water can impinge, when said members move therethrough, to bias the same toward a position having a minimum resistance to such motion through water, releasable latch means normally holding said surfaces in a position such that pulling said members through water by force exerted on said first connecting means creating a transverse component of force tending to move said members at an angle to the direction of pull, said latch means being connected to both members and said first connecting means and being yieldable in response to a pull therebetween exceeding a predetermined amount to release the members having said surfaces for relative movement in response to said bias into a position in which said transverse component of force is reduced.

GEORGE W. DUNN.

References Cited in the file of this patent

UNITED STATES PATENTS

| Number | Name | Date |
|---|---|---|
| 1,408,927 | Bond | Mar. 7, 1922 |
| 1,749,464 | Bond | Mar. 4, 1930 |
| 1,861,237 | Morgan et al. | May 31, 1932 |
| 2,295,250 | Zenewich | Sept. 8, 1942 |